United States Patent [19]

Nguyen

[11] Patent Number: 5,555,002

[45] Date of Patent: Sep. 10, 1996

[54] METHOD AND DISPLAY CONTROL SYSTEM FOR PANNING

[75] Inventor: Hung Nguyen, Poway, Calif.

[73] Assignee: Proxima Corporation, Del.

[21] Appl. No.: 475,065

[22] Filed: Jun. 7, 1995

Related U.S. Application Data

[63] Continuation of Ser. No. 235,292, Apr. 29, 1994, abandoned.

[51] Int. Cl.⁶ ............................... G09G 5/34
[52] U.S. Cl. ............................ 345/121; 345/127
[58] Field of Search ..................... 345/121, 127, 345/129, 132

[56] References Cited

U.S. PATENT DOCUMENTS

| | | |
|---|---|---|
| Re. 31,200 | 4/1993 | Sukonick . |
| 4,197,590 | 5/1980 | Sukonick . |
| 4,442,495 | 4/1984 | Sukonick . |
| 4,786,897 | 11/1988 | Takanashi et al. .................. 345/121 X |
| 4,896,148 | 1/1990 | Kurita ..................... 345/129 |
| 5,010,324 | 4/1991 | Yamamoto ............................. 345/121 |
| 5,172,107 | 12/1992 | Kanno et al. ........................ 345/121 X |
| 5,231,696 | 7/1993 | Roux et al. ........................ 345/121 X |
| 5,266,932 | 11/1993 | Tokumitsu .......................... 345/121 X |

*Primary Examiner*—Ulysses Weldon
*Attorney, Agent, or Firm*—Bernard L. Kleinke; Peter P. Scott

[57] ABSTRACT

A new and improved display control system which includes a logic arrangement for causing a displayed image indicative of a portion of a corresponding larger image to be displayed upon an input command from a user. A line control circuit responsive to user input commands enables the displayed image to be shifted visually from a current visualization position, up or down, row by row for line pan visualization of corresponding portions of the larger image. A pixel control circuit also responsive to user input command enables the displayed image to be shifted visually from a current visualization position right or left, column by column, for column pan visualization of corresponding portions of the larger image. The line control circuit and the pixel control circuit operate independently of one another or in combination with one another to achieve any desired panning effect.

16 Claims, 4 Drawing Sheets

WORKSTATION IMAGE

COMPRESSED PANEL IMAGE

LEFT CENTRAL PAN PORTION

RIGHT CENTRAL PAN PORTION

UPPER CENTRAL PAN PORTION

LOWER CENTRAL PAN PORTION

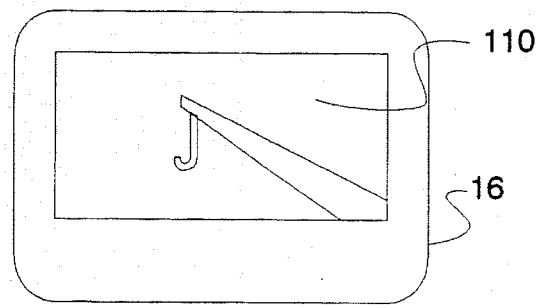
UPPER LEFT PAN PORTION
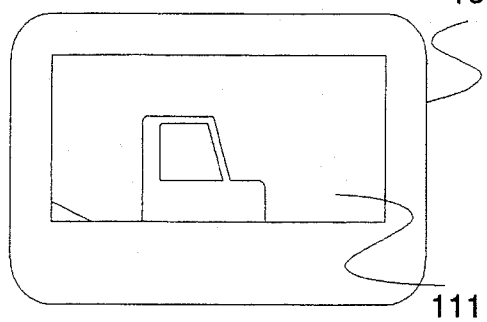
UPPER RIGHT PAN PORTION
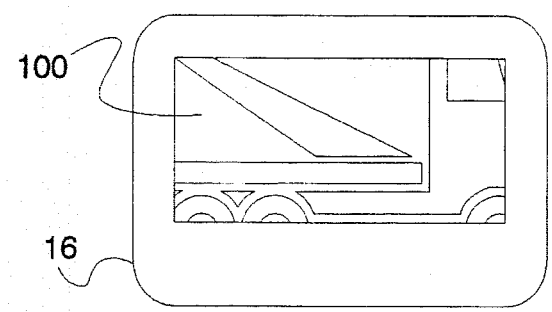
CENTRAL PAN PORTION
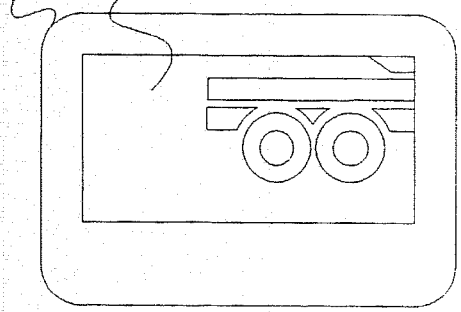
LOWER LEFT PAN PORTION
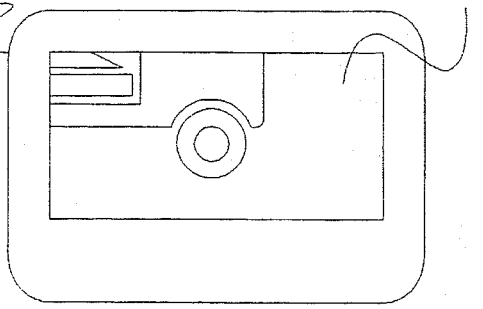
LOWER RIGHT PAN PORTION

METHOD AND DISPLAY CONTROL SYSTEM FOR PANNING This application is a continuation of application Ser. No. 08/235,292, filed Apr. 29, 1994, status now abandoned.

TECHNICAL FIELD

The present invention relates in general to a display control system and method of controlling the display of information images. The invention more particularly relates to a display control system and method of controlling a display to enable panning visualization of a virtual 1,280× 1024 workstation image on a low resolution 1024×768 personal computer liquid crystal display panel monitor.

BACKGROUND ART

There have been many different types and kinds of display control systems for enabling the visualization of a workstation image on a low resolution monitor. In this regard, such systems typically require expensive, high speed flash type analog to digital converters to convert the incoming workstation-based information at a sufficiently fast rate to enable compression of the information for storage into expensive buffer memory units for mapping purposes. In this regard, once mapped, a virtual workstation image can be displayed in its entirety or panned.

While such display control systems have been satisfactory for some applications, it would be highly desirable to have a new and improved display control system which is capable of enabling a 1,280×1024 workstation image to be displayed on a low resolution 1024×768 personal computer liquid crystal display monitor. Moreover, such a display control system should enable panning of the workstation image in a fast and convenient manner without the necessity of expensive buffer memory units or high speed flash type analog to digital converters.

DISCLOSURE OF INVENTION

Therefore, the principal object of the present invention is to provide a new and improved display control system and method of using it to enable a 1,280×1024 workstation image to be displayed on a low resolution 1024×768 personal computer liquid crystal display monitor.

Another object of the present invention is to provide such a new and improved display control system and method of using it to enable panning of the workstation image in a fast and convenient manner on a 1024×768 low resolution monitor.

Briefly, the above and further objects of the present invention are realized by providing a new and improved display control system which includes a logic arrangement for causing a displayed image indicative of a portion of a corresponding larger image to be displayed upon an input command from a user. A line control circuit responsive to user input commands enables the displayed image to be shifted visually from a current visualization position, up or down, row by row for line pan visualization of corresponding portions of the larger image. A pixel control circuit also responsive to user input command enables the displayed image to be shifted visually from a current visualization position right or left, column by column, for column pan visualization of corresponding portions of the larger image. The line control circuit and the pixel control circuit operate independently of one another or in combination with one another to achieve any desired panning effect.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 3–12 illustrate various image panning positions on the liquid crystal display panel of FIG. 1.

BEST MODE FOR CARRYING OUT THE INVENTION

Figure 1:
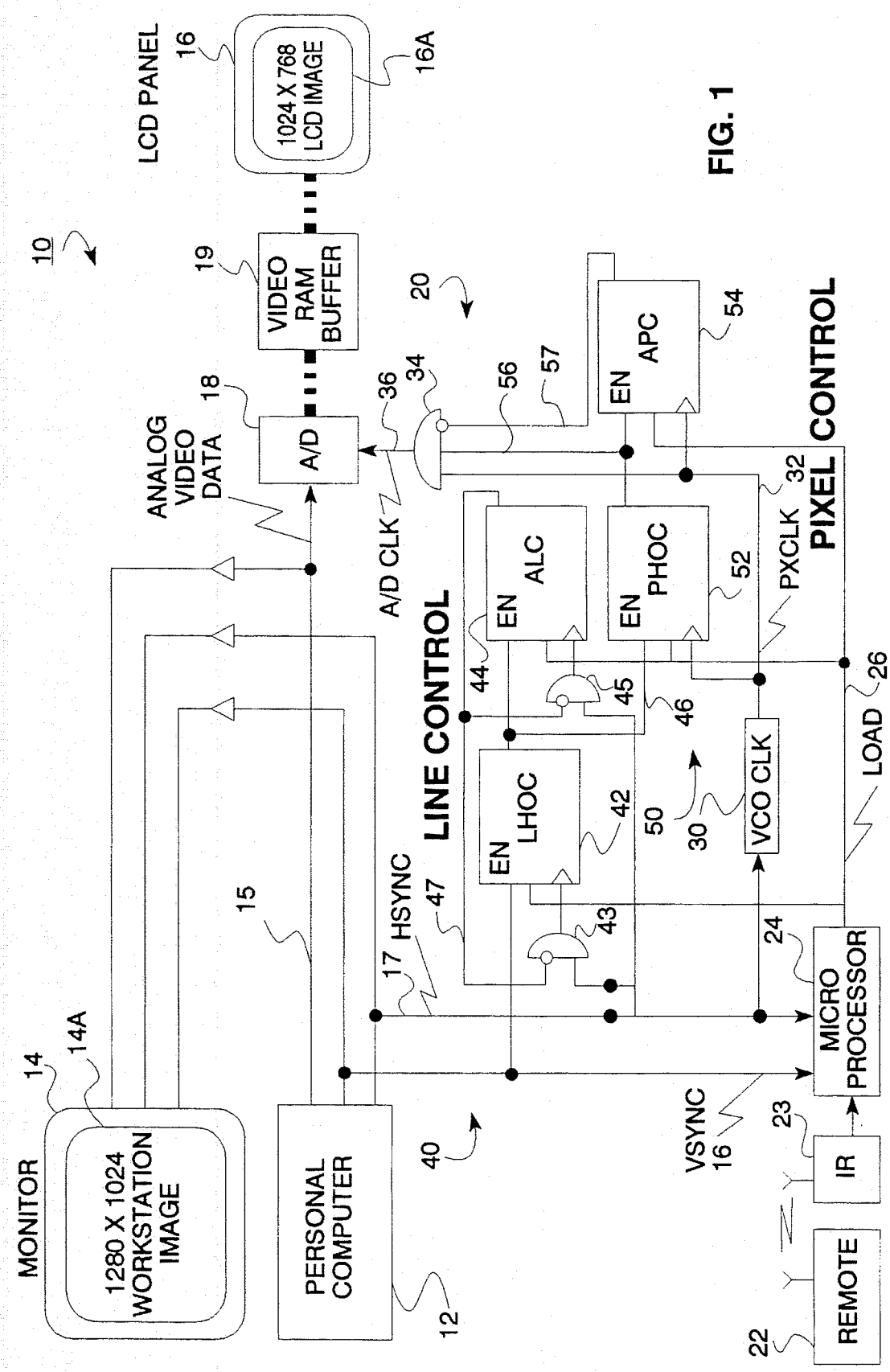
FIG. 1 is a block diagram of a display control system which is constructed in accordance with the present invention.
Figure 2:
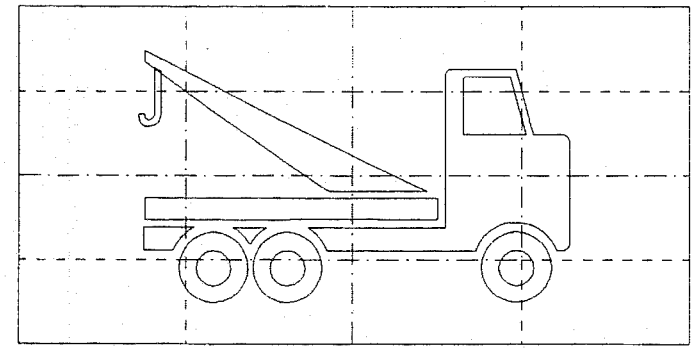
FIG. 2 is a diagrammatic view illustrating in phantom various image panning positions corresponding to the workstation image of FIG. 1.

Referring now to the drawings, and more particularly to FIG. 1 thereof, there is shown a display control system 10 which is constructed in accordance with the present invention. The display control system 10 is illustrated connected to a personal computer 12, having a video control module (not shown) for driving a workstation monitor 14 and a liquid crystals display monitor 16 simultaneously. The display control system 10, in accordance with the method of the present invention, can rewrite the video information from the personal computer 12 to both the workstation monitor 14 having an M by N or 1280–1024 pixel element matrix array and the liquid crystal display unit 16 having an m by n 1024–768 pixel element matrix array simultaneously. In this regard, as more fully disclosed in copending U.S. Patent application Ser. No. 08/237,013 filed Apr. 29, 1994 the display control system 10 compresses a workstation Video image 14A displayed on the workstation monitor 14 in such a manner so that substantially the entire 1280×1024 workstation image is displayed as a 1024×768 liquid crystal display image 16A by the liquid crystal display panel 16. The display control system 10 can control the liquid crystal display unit 16 to enable the workstation image 14A to be panned in accordance with the method of the present invention.

The display control system 10 generally includes a control circuit 20 that controls the sampling of an incoming analog RGB video data signal 15, developed by the video control module in the personal computer 12. In this regard, the control circuit 20 causes only a selected portion of the incoming video data signal 15 to be sampled and converted into digital data by an analog to digital converter 18. A control gate 34 under the control of the control circuit 20, passes an A/D clock signal 36 that enables the analog to digital converter 18 to sample the incoming video data signal 15 for conversion purposes. As will be explained hereinafter, the A/D clock signal 36 is synchronized with the incoming video data signal 15 via a pixel clock signal 32.

A video data buffer RAM memory unit 19 coupled to the digital converter 18 by means not shown, stores the selected and converted portion of the video information, where the selected portion is indicative of a 1024×768 portion of 1280×1024 workstation video image. As will be explained hereinafter, a user employing a remote control panning device 22 can select any 1024×768 portion of the 1280× 1024 workstation image to be displayed on the liquid crystal display panel 16.

A microprocessor 24 coupled to the remote control panning device 22 via an infrared receiver 23, causes the displayed portion of the workstation image to be changed in response to input command signals generated by the device 22.

A voltage controlled oscillator circuit or pixel clock generator 30, synchronized by an HSYNC signal 17 develops the pixel clock signal 32 for synchronizing the A/D clock signal 36 with the incoming video data signal 15.

In operation, as best seen in FIGS. 2–7, whenever a user desires to pan the workstation image 16A displayed on the liquid crystal display panel 16, the user, via the remote control panning device 22, causes a panning command signal to be transmitted to the microprocessor 24. In response to receiving the panning control signal, the microprocessor 24, via the control circuit 20, causes the workstation image 16A displayed on the liquid crystal display panel 16 to be changed. In this regard, only a central portion 100 (FIG. 10) of the workstation image 14A is displayed, where the central portion 100 is defined by a 1024×768 matrix array of pixel images indicative of lines 129 to 896 of the workstation image 14A and columns 129 to 1152 of the workstation image 14A.

After the central portion 100 is displayed, the user, via the remote control panning device 22, can cause pan left, right, up and down signals to be transmitted to the microprocessor 24 to view different portions of the workstation image.

In response to each pan left signal received by the microprocessor 24, the control circuit 20 causes the displayed image to be changed column by column to a left central portion 102 of the workstation image 14A, where the left portion 102 is defined by a 1024×768 matrix array of pixel images indicative of lines 129 to 896 of the workstation image 14A and columns $(129-X_L)$ to $(1152-X_L)$, where $X_L$ is a whole number integer between 1 and 128.

From the foregoing, it will be understood by those skilled in the art that when the user pans the LCD image to a full left position, the left central portion 102 is defined by a 1024×768 matrix array of pixel images indicative of lines 129 to 896 of the workstation image 14A and columns 1 to 1024 of the workstation image 14A.

In a similar manner, in response to each pan right signal received by the microprocessor 24, the control circuit 20 causes the displayed image to be changed to a right central portion 104 of the workstation image, where the right portion 104 is defined by a 1024×768 matrix array of pixel images indicative of lines 129 to 896 of the workstation image and columns $(129+X_R)$ to $(1152+X_R)$, where $X_R$ is a whole number integer between 1 and 128.

Thus, when the user pans the image to a full right portion, the right central portion 104 is defined by a 1024×768 matrix array of pixel images indicative of lines 129 to 896 of the workstation image 14A and columns 256 to 1280 of the workstation image 14A.

In response to each pan up signal received by the microprocessor 24, the control circuit 20 causes the displayed image to be changed to an upper central portion 106 of the workstation image, where the upper portion is defined by a 1024×768 matrix array of pixel images indicative of lines $(129-Y_U)$ to $(896-Y_U)$, where $Y_U$ is a whole number integer between 1 and 128.

When the image is panned to a full upper position, the upper central portion 106 is defined by a 1024×768 matrix array of pixel images indicative of lines 1 to 768 of the workstation image 14A and columns 129 to 1152 of the workstation image 14A.

In a similar manner, in response to each pan down signal received by the microprocessor 24, the control circuit 20 causes the displayed image to be changed to a lower central portion 108 of the workstation image 14A, where the lower portion 108 is defined by a 1024×768 matrix array of pixel images indicative of lines $(129+Y_D)$ to $(896+Y_D)$, where $Y_D$ is a whole number integer between 1 and 128.

Thus, when the user pans the displayed image to a full lower position, the lower portion 108 is defined by a 1024×768 matrix array of pixel images indicative of lines 258 to 1024 of the workstation image 14A.

While in the preferred embodiment of the present invention the displayed image was defined by a 1024×768 matrix array of pixel images, those skilled in the art will understand other matrix arrays of different sizes are contemplated within the scope of the invention.

Considering now the display control system 10 in greater detail, the control circuit 20 generally comprises a line control arrangement 40 and a column or pixel control arrangement 50. The line control arrangement 40 determines which lines, in lines 1 to 1024 of the workstation image, will be displayed by liquid crystal display 16. In a similar manner, the pixel control arrangement 50 determines which columns, in columns 1 to 1280 of the workstation image, will be displayed by the liquid crystal display 16.

Considering now the line control arrangement 40 in greater detail with reference to FIG. 1, the line control arrangement 40 generally includes a line hold off counter 42 and an active line counter 44 and a pair of decrement gates 43, 45 which couple decrement pulses to each of the counters 42 and 44 respectively. The line hold off counter 42, is synchronized with the incoming video data signal 15 via a VSYNC signal 16 generated by the video module in the personal computer 12. In this regard, the line hold off counter is enabled by a VSYNC signal 16 generated by the personal computer 12.

The line hold off counter 42 counts a predetermined Y number of display lines, following the VSYNC signal 16, to be inhibited from display. In this regard, the microprocessor 24, upon receiving the pan command signal, causes the line hold off counter 42 to be loaded with an initialize Y count via a load signal bus 26. The Y count equals the number of lines the workstation image can be panned either up or down. In this regard, Y can be between a minimum number and a maximum number of lines capable of being panned up or down depending on the size of the screen. More particularly, Y is defined by equation (1) that follows:

Y = Number of lines inclusive of VSYNC pulses +    (1)
VSYNC blanking interval +
Starting line number of the image The following examples will illustrate the application of equation (1):

| Screen Location | Equation Application (Y) |
| --- | --- |
| Upper Left Quadrant Portion | Y = VSYNC pulses + VSYNC blanking + 0 |
| Lower Left Quadrant Portion | Y = VSYNC pulses + VSYNC blanking + 256 |
| Vertically Centralized Portion | Y = VSYNC pulses + VSYNC blanking + 128 |

From the foregoing, it should be understood that the initialized value of Y depends upon both the screen size and the starting line number of the image. Thus, for example, to start from a center screen position with a screen size of 1024×768 pixels, Y will be initialized to a value of 128 plus VSYNC pulses plus VSYNC blanking.

In operation, when the VSYNC signal 16 goes high at the end of a previous frame time period, the line hold off counter 42 is enabled causing its output to a logic LOW level disabling the active line counter 44 and the pixel control arrangement 50. The line off counter 42 is then loaded with the initialize count of 128, which count is decremented once each time the HSYNC signal 17 goes to a logic HIGH level. When the line hold off counter 42 is decremented to zero, a terminal count signal 46 is generated which in turn, enables both the active line counter 44, and the pixel control arrangement 50 as will be explained hereinafter in greater detail.

When the active line counter 44 is enabled, it is decrement once for each occurrence of the HSYNC signal 17 after the terminal count signal 46 rises to a logic HIGH level.

The active line counter 44 is initialized by the microprocessor 24, via the load signal bus 26, with a predetermined M number, where M is indicative of the total number of matrix display lines available on the liquid crystal display unit 16. In this regard, the counter 44 is loaded with the number 768 via the load signal bus 26.

When the active line counter 44 is decremented to zero, it generates a disable signal 47, which in turn, causes both disable gates 43 and 45 to be disabled.

The microprocessor 24 is responsive to both the VSYNC signal 16 and the HSYNC signal 17 as well as the various pan commands transmitted by the user via the remote control device 22. In this regard, the microprocessor 24 includes a conventional algorithm for determining the current position of the panel image relative to the corresponding workstation image. Based on this determination the microprocessor 24 causes the line control circuit 40 and the pixel control circuit 50 to be loaded with appropriate counts for inhibiting and enabling display of the user selected portion of the workstation image.

Considering now the pixel control arrangement 50 in greater detail, with reference to FIG. 1, the pixel control arrangement generally includes a pixel hold off counter 52 and an active pixel counter 54. The pixel hold off counter 52 is synchronized with the incoming analog video data signal 15 via the line hold off counter terminal count signal 46 and the pixel clock signal 32.

When the terminal count signal 46 goes to a logic HIGH level, the pixel hold off counter 52 is enabled. In this regard, the counter 52 is initialized by the microprocessor 24 which causes the counter 52 to be loaded with an initialize X count via the load signal bus 26. The X count equals the number of columns the workstation image can be panned either left or right. In this regard, X can be between a minimum number and a maximum number of columns capable of being panned either to the left or to the right depending on the size of the screen. More particularly, X is defined by equation (2) that follows:

$$X = \text{Number of pixels inclusive of HSYNC pulses} + \text{HSYNC blanking interval} + \text{Starting pixel column number of the image} \quad (2)$$

The following examples will illustrate the application of equation (2):

| Screen Location | Equation Application (X) |
| --- | --- |
| Upper Left Quadrant Portion | X = HSYNC pulses + HSYNC blanking interval + 0 |
| Upper Right Quadrant Portion | X = HSYNC pulses + HSYNC blanking interval + 256 |
| Horizontally Centralized Portion | X = HSYNC pulses + HSYNC blanking + 128 |

From the foregoing, it should be understood that the initialized value of X depends upon both the screen size and the starting pixel column number within the panned image. Thus, for example, to start from a center screen position with a screen size of 1024 by 768 pixels, X will be initialized to a value of 128 plus HSYNC pulses plus HSYNC blanking.

When the pixel hold off counter 52 is enabled, it is decrement once for each occurrence of the pixel clock signal 32. Thus, the output of the pixel hold off counter 52 will remain at a logic LOW level for 128 pixel clocks. When the pixel hold off counter 52 is decremented to zero, its output generates a start sampling signal 56, goes to a logic HIGH level which in turn, enables both the active pixel counter 54 and the A/D clock gate 34.

When the active pixel counter 54 is enabled, it is decremented once for each occurrence of the pixel clock signal 32.

The active pixel counter 54 is initialized by the microprocessor 24, via the load signal bus 26 with a predetermined N number, where N is indicative of the total number of matrix display columns available on the liquid crystal display unit 16. In this regard, the counter 54 is loaded with the number 1024 via the load signal bus 26.

When the active pixel counter 54 is enabled, it is decremented once for each occurrence of the pixel clock signal 32. In this regard, when the counter 54 is decremented to a zero count, it generates a stop sampling signal 57 which in turn, causes the A/D clock gate 34 to be disabled.

From the foregoing, it will be understood by those skilled in the art that the A/D clock gate 34 is enabled only during that time period the pixel hold off counter start sampling signal 56 is at a logic HIGH level.

Figure 3:
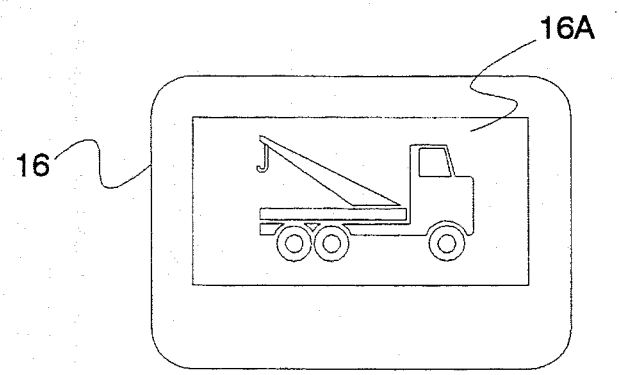
Figure 4:
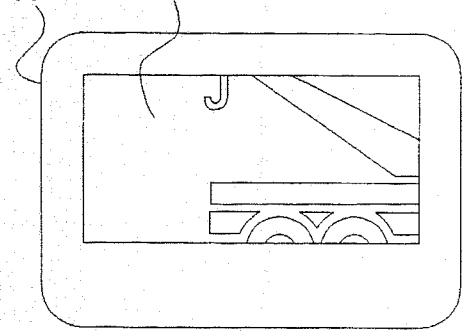
Figure 5:
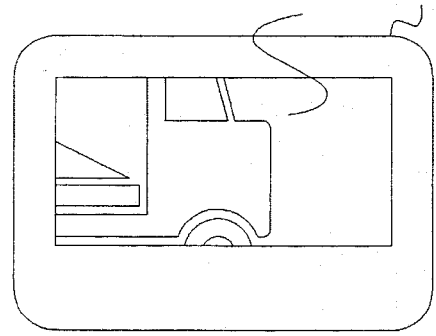
Figure 6:
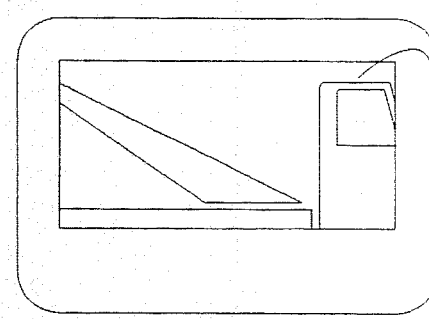
Figure 7:
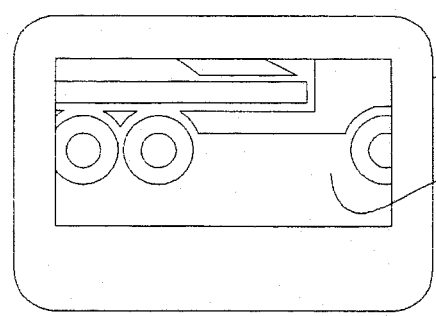
Figure 13:
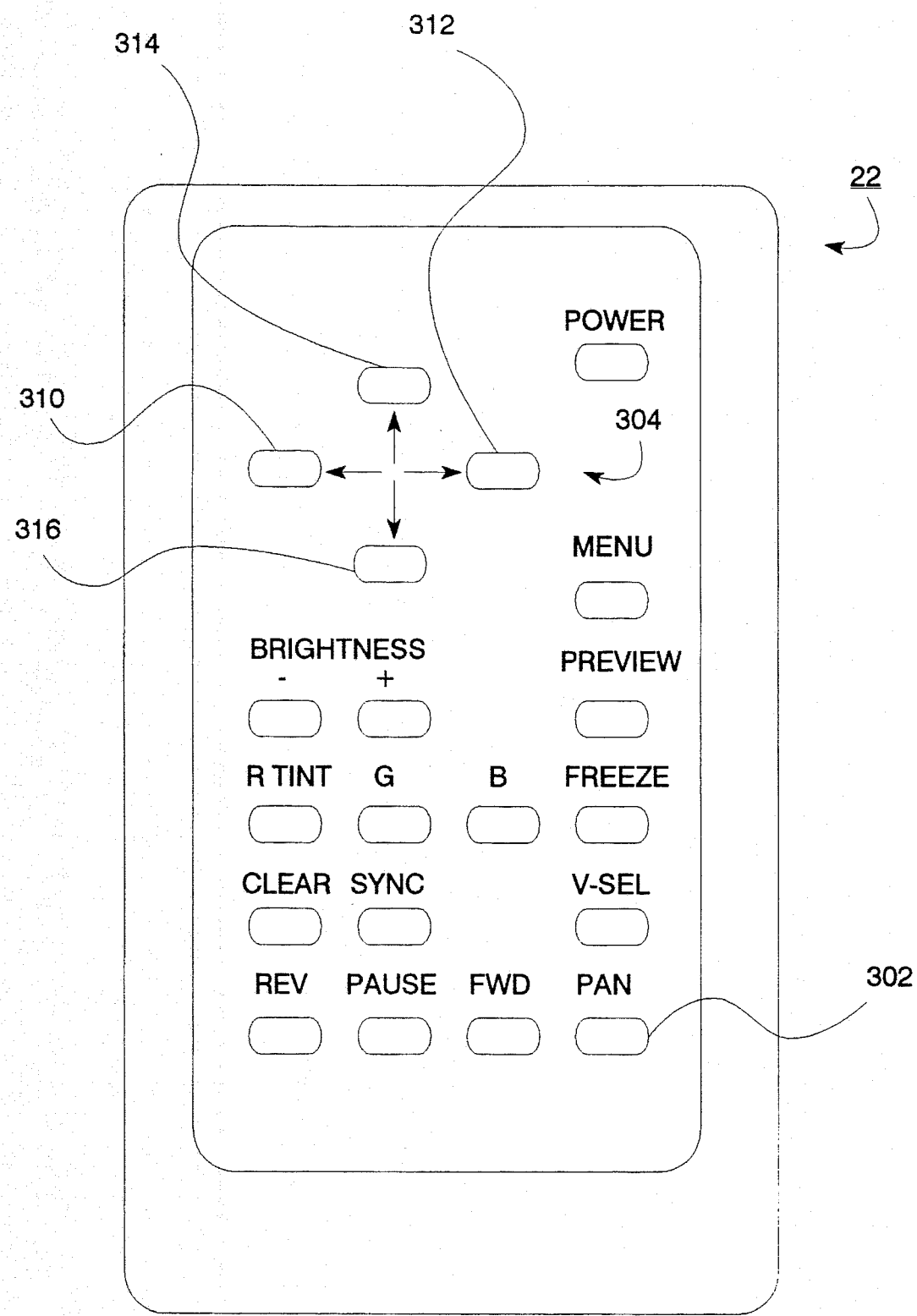
FIG. 13 is a top plan view of the remote control unit of FIG. 1.

Considering now the remote device 22 in greater detail with reference to FIG. 12, the remote device 22 generally includes a pan command key 302 which, when actuated cause a pan command to be sent to the microprocessor 24. In this regard, the control circuit will cause the compressed image 16A as illustrated in FIG. 3 to be changed to a central pan image 100 (FIG. 10) upon receipt of the pan command.

The remote device 22 also includes a group 304 of panning keys that includes a pan left key 310, a pan right key 311, a pan up key 312, and a pan down key 313. In operation, by actuating the keys 310–311 any panning position as illustrated in FIGS. 3–11 can be achieved. In this regard for example, an upper left pan position 110, an upper right pan position 111, a lower left pan position 112, and a lower right pan position 113 can be viewed as best seen in FIGS. 8–9 and 11–12 respectively.

By way of example, initialized values for X and Y with a screen size of 1024 by 768 pixels was specified for a centralized portion of the image to be panned. It will be understood by those skilled in the art that other initialized values of X and Y will result for different screen sizes. Thus, X and Y will be different for screen sizes of 1152 by 900 pixels, and the like.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A panning control system including a video source for generating video information signals including a horizontal timing signal and a vertical timing signal indicative of a large video image and a display device for displaying a small display image, comprising:

analog to digital conversion means coupled between the video source and the display device for converting the video information signals into digital information signals to enable a selected portion of the large video image to be displayed on the display device;

the large video image having a video pixel element array of M columns by N rows and the display image having a display pixel element array of m columns by n rows, wherein M, N m and n are positive integers and wherein M and N are larger than m and n, respectively;

gate control means coupled to said conversion means for generating a conversion clock signal to activate selectively said conversion means for converting a selected portion of the video information signals corresponding to said selected video image portion to be displayed as the display image, said selected video image portion having a video image portion pixel element array of m columns by n rows;

line control means responsive to the vertical timing signal and coupled to said gate control means for generating a row control signal to enable said conversion means to be activated;

said line control means including a line hold off means synchronized with the vertical timing signal for inhibiting the display of the video information signals until the first row of said selected video image portion is generated by the video source, wherein said line hold off means generates said row control signal when the first row is generated by the video source;

said line control means further including an active line means coupled to said line hold off means and responsive to said row control signal for enabling the display of the video information signals for all n rows of said selected video image portion when said row control single is generated by said line hold off means;

pixel control means responsive to the horizontal timing signal and coupled to said line control means and said gate control means for generating a column control signal to enable said conversion means to be activated;

said pixel control means including a pixel hold off means synchronized with the video information signal for inhibiting the display of the video information signal until the first column of said selected video image portion is generated by the video source, wherein said pixel hold off means generates said column control signal when the fist column is generated by the video source;

said pixel control means further including an active pixel means coupled to said pixel control means and responsive to said column control signal for enabling the display of the video information signal for all m columns of said selected video image portion when said column control signal is generated by said pixel hold off means;

wherein said conversion means enables the displaying of said selected video image portion as the display image only when said column control signal and said row control signal are generated substantially concurrently;

control means for generating horizontal pan direction command signals and vertical pan direction command signals to adjust said selected video image portion to be displayed, whereby another portion of the video information signal indicative of another portion of the video image is converted for displaying as the display image;

processor means coupled to said pixel control means and said line control means for determining the video information singles to be inhibited until the occurrence of the first column and the first row of said selected video image portion; and said processor means being responsive to said horizontal pan direction command signals and said vertical pan direction command signals to adjust the selection of the video information signals which are to be inhibited, wherein the selected video image portion to be displayed is adjusted continually by at least one column from a previously selected video image portion in response to said horizontal pan direction command signals and which selected video image portion is adjusted continually by at least one row from said previously selected video image portion in response to a vertical pan direction command signals for changing the portion of the video image converted into the display information signal, whereby each one of the converted video image portions is displayed sequentially continually as the small display image which appears to pan across the large video image.

2. A panning control system according to claim 1, wherein said control means further generates a pan initialization signal, said processor means being responsive to said pan initialization signal to cause a predetermined portion of the large video image to be selected as said selected video image portion which is displayed initially on the display device.

3. A panning control system according to claim 2, wherein said predetermined portion is a central portion of the large video image.

4. A panning control system according to claim 2, wherein said processor means continues to facilitate the selection of the video information signals which are to be inhibited in response to said horizontal pan direction command signals and said vertical pan direction command signals until said direction command signals are no longer generated, wherein said processor means ceases to adjust the selection of the video information signals which are to be inhibited for enabling a final desired user selected video image portion to be displayed on the display device.

5. A panning control system according to claim 1, wherein said selected video image portion has a pixel element matrix array of 1024 columns×768 rows.

6. A panning control system according to claim 5, wherein said large video image has a pixel element matrix array of 2048 columns×1024 rows.

7. A method of panning across a large video image defined by video information signals including a horizontal timing signal and a vertical timing signal generated by a video source, comprising:

using a display device for displaying a small display image;

converting the video information signals into a digital information signals with a conversion means to enable a selected portion of the large video image to be displayed on the display device, the large video image having a video pixel element array of M columns by N rows and the display image having a display pixel element array of m columns by n rows, wherein M, N, m and n are positive integers and wherein M and N are larger than m and n, respectively;

generating a conversion clock signal to activate selectively said conversion means with a gate control means for converting a selected portion of the video information signals corresponding to said selected video image portion to be displayed as the display image, said selected video image portion having a video image portion pixel element array of m columns by n rows;

generating a row control signal with a line control means responsive to the vertical timing signal to enable said conversion means to be activated;

inhibiting the display of the video information signals with a line hold off means synchronized with the vertical timing signal until the first row of said selected video image portion is generated by the video source, wherein said line hold off means generates said row control signal when the first row is generated by the video source;

enabling the display of the video information signals for all n rows of said selected video image portion with an active line means when said row control signal is generated by said line hold off means;

generating a column control signal with a pixel control means to enable the conversion means to be activated;

inhibiting the display of the video information signals with a pixel hold off means synchronized with the video information signals until the first column of said selected video image portion is generated by the video source, wherein said pixel hold off means generates said column control signal when the first column is generated by the video source;

enabling the display of the video information signals for all m columns of said selected video image portion with an active pixel means when said column control signal is generated by said pixel hold off means;

displaying said selected video image portion as the display image only when said column control signal and said row control signal are generated substantially concurrently;

generating horizontal pan direction command signals and vertical pan direction command signals with control means to adjust said selected video image portion to be displayed, whereby another portion of the video information signal indicative of another portion of the video image is converted for displaying as the display image;

determining the video information signals to be inhibited until the occurrence of the first column and the first row of said selected video image portion with a processor means; and adjusting the selection of the video information signals which are to be inhibited, wherein the selected video image portion to be displayed is adjusted continually by at least one column from a previously selected video image portion in response to said horizontal pan direction command signals and which selected video image portion is adjusted continually by at least one row from said previously selected video image portion in response to said vertical pan direction command signals for changing the portion of the video image converted into the display information signal, whereby each one of the converted video image portions is displayed sequentially continually as the small display image which appears to pan across the large video image.

8. A method of panning according to claim 7, wherein said step of generating vertical pan direction command signals includes producing a pan up command signal, producing a pan down command signal, and said step of generating horizontal pan direction command signals includes producing a pan right command signal and producing a pan left command signal.

9. A method of panning according to claim 8, further including producing a pan initialization signal.

10. A method of panning according to claim 9, further including selecting a predetermined portion of the video image as said selected video image portion to be displayed on the display device in response to said pan initialization signal being produced.

11. A method of panning according to claim 10, wherein said predetermined portion is a central portion of the large video image to be displayed on the display device as the display image.

12. A control system for causing the panning display on a display device of video information signals generated by a video source said signal being indicative of a large video image, comprising:

means for inhibiting the display of the video information signals to facilitate the display of a selected portion of the large video image on the display device;

means for generating a panning signal coupled to said inhibiting means to cause said selected video image portion to be preselected initial portion only of the large video image;

determining means coupled to said inhibiting means for determining the video information signals to be inhibited to enable only the selected video image portion to be displayed;

means for generating a direction indicating signal for adjusting continuously the selection of the video information signals which are to be inhibited for enabling the sequentially displayed selected video image portions to appear to move substantially continuously relative to the large video image along a direction indicated by said direction signal while said direction signal is being generated in a slow, panning rate of speed; and means responsive to the termination of said direction signal for causing the display of a final portion only of the large video image to complete the panning operation.

13. A control system according to claim 12, wherein said preselected initial portion is a central portion of the large video image.

14. A control system according to claim 12, wherein said means generating a direction indicating signal includes arrow control input means.

15. A control system according to claim 12, wherein said means generating a panning signal includes panning input means manually operable by a user.

16. A control system for causing the panning display on a display device of video information signals generated by a video source said signal being indicative of a large video image, comprising:

analog to digital conversion means for supplying a continuous stream of video information signals indicative of the large video image;

logic circuit means responsive directly to said continuous stream of signals without storing them for gating video information signals of an initial selected portion only of the large video image on the display device;

panning control means for causing subsequently said logic circuit to gate other video information signals of another selected portion only of the large video image for display on the display device, said another portion only overlapping substantially with the initial selected portion only during a subsequent frame interval;

said panning control means for causing subsequently said logic circuit to gate still another video information signals of yet another selected overlapping portion only during still another subsequent frame interval, whereby a sequence of overlapping images are gated continuously from the video information signals for display on the display device to create images appearing to pan across the large video image.

* * * * *

UNITED STATES PATENT AND TRADEMARK OFFICE
CERTIFICATE OF CORRECTION

PATENT NO : 5,555,002

DATED : September 10, 1996

INVENTOR(S): Hung Nguyen

It is certified that error appears in the above-identified patent and that said Letters Patent is hereby corrected as shown below: On title page, Item 56, line 3, delete "4/1993", and substitute therefor --4/1983--.

Item 56, line 4, delete "5/1980", and substitute therefor --4/1980--.

Column 7, line 21, after "N", insert --,--.

Column 7, line 47, delete "single", and substitute therefor --signal--.

Column 7, line 54, delete "signal", and substitute therefor --signals--.

Column 7, line 55, delete "signal", and substitute therefor --signals--.

Column 7, line 59, delete "fist", and substitute therefor --first--.

Column 7, line 64, delete "signal", and substitute therefor --signals--.

Column 8, line 65, after "into" delete "a".

Column 10, line 66, after "responsive", delete "directly to said continuous stream of signals without storing them", and substitute therefor --to the video source".

UNITED STATES PATENT AND TRADEMARK OFFICE
CERTIFICATE OF CORRECTION

PATENT NO. : 5,555,002
DATED : September 10, 1996
INVENTOR(S) : Hung Nguyen

It is certified that error appears in the above-indentified patent and that said Letters Patent is hereby corrected as shown below:

Column 10, line 67, after "gating", insert --the--.

Signed and Sealed this

Seventeenth Day of June, 1997

Attest:

BRUCE LEHMAN

Attesting Officer

Commissioner of Patents and Trademarks